US012779626B2

(12) United States Patent
Matsui

(10) Patent No.: US 12,779,626 B2
(45) Date of Patent: Nov. 3, 2026

(54) CAVITATION PROCESSING METHOD AND CAVITATION PROCESSING APPARATUS

(71) Applicant: SUGINO MACHINE LIMITED, Namerikawa City (JP)

(72) Inventor: Taiki Matsui, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 219 days.

(21) Appl. No.: 18/772,157

(22) Filed: Jul. 13, 2024

(65) Prior Publication Data

US 2025/0041993 A1 Feb. 6, 2025

(30) Foreign Application Priority Data

Aug. 4, 2023 (JP) ................................ 2023-127750

(51) Int. Cl.
*B24C 1/00* (2006.01)
*B23F 19/00* (2006.01)

(52) U.S. Cl.
CPC .............. *B24C 1/006* (2013.01); *B23F 19/00* (2013.01)

(58) Field of Classification Search
CPC .......... B21D 31/06; C21D 7/08; B24C 1/006; B24C 7/0007
See application file for complete search history.

(56) References Cited

U.S. PATENT DOCUMENTS 6,315,646 B1 * 11/2001 Hoyashita .............. B23F 19/00 451/37
8,100,027 B2 * 1/2012 Sato ......................... C21D 7/04 74/460
11,465,259 B2 * 10/2022 Sanders .................. B24C 3/325
2019/0078171 A1 3/2019 Obayashi et al.
2022/0063058 A1 * 3/2022 Matsui ..................... C21D 7/06
2022/0203485 A1 6/2022 Kamisaka et al.
2022/0203500 A1 6/2022 Sawakoshi et al.

FOREIGN PATENT DOCUMENTS

JP 6872929 B2 5/2021

OTHER PUBLICATIONS

Extended European Search Report mailed on Jan. 7, 2025 in a corresponding European Patent Application No. 24191355.7 (9 pages).

* cited by examiner

*Primary Examiner* — Matthew Katcoff
(74) *Attorney, Agent, or Firm* — United IP Counselors, LLC

(57) ABSTRACT

The cavitation processing method, includes: immersing a nozzle that ejects a jet of a processing liquid of cavitation, a workpiece including a groove portion extending in a left-right direction and having edge portions at a front and a rear as viewed from the nozzle, and a guide member including a rectifying portion that flows the jet in a front-rear direction and a closing portion that closes a front end of the rectifying portion in the processing liquid; moving the closing portion to close to a front edge portion; ejecting the jet from the nozzle; and introducing the jet to the rectifying portion from the rear to cause the jet to collide with the closing portion for changing a flow direction of the jet to cause the jet to collide with a bottom portion of the groove portion.

12 Claims, 6 Drawing Sheets

CAVITATION PROCESSING METHOD AND CAVITATION PROCESSING APPARATUS

CROSS-REFERENCE TO RELATED APPLICATIONS

This application claims the benefit of priority to Japanese Patent Application No. 2023-127750, filed on Aug. 4, 2023, the entire contents of which are hereby incorporated by reference.

BACKGROUND

1. Technical Field

The present invention relates to a cavitation processing method and a cavitation processing apparatus for performing a cavitation processing on a surface of a workpiece.

2. Description of the Background

Conventionally, a cavitation processing is performed on a workpiece made of metal (Japanese Patent No. 6872929). In the cavitation processing, a jet of a fluid containing a cavity (bubble) is caused to collide with the workpiece to process the surface of the workpiece by an impact force when the cavity collapses. The cavitation processing applies compressive residual stress to the surface of the workpiece.

BRIEF SUMMARY

The workpiece on which the cavitation processing is performed has various shape and size. In order to perform an appropriate cavitation processing, it is necessary to cause the jet to collide with the surface of the workpiece by an appropriate method according to the conditions of the workpiece.

An object of the present invention is to provide a cavitation processing method and a cavitation processing apparatus that perform the cavitation processing on a bottom portion of a groove of the workpiece.

A first aspect of the present invention provides a cavitation processing method, including:

- immersing a nozzle that ejects a jet of a processing liquid of cavitation, a workpiece including a groove portion extending in a left-right direction and having edge portions at a front and a rear as viewed from the nozzle, and a guide member including a rectifying portion that flows the jet in a front-rear direction and a closing portion that closes a front end of the rectifying portion in the processing liquid;
- moving the closing portion to close to a front edge portion;
- ejecting the jet from the nozzle; and introducing the jet to the rectifying portion from the rear to cause the jet to collide with the closing portion for changing a flow direction of the jet to cause the jet to collide with a bottom portion of the groove portion.

A second aspect of the present invention provides a cavitation processing apparatus, including:

- a tank configured to store a processing liquid;
- a nozzle configured to be immersed in the tank to eject a jet of the processing liquid;
- a holding member disposed in the tank, the holding member configured to hold a workpiece having a groove portion extending in a left-right direction and having edge portions at a front and a rear as viewed from the nozzle; and
- a guide portion disposed below the workpiece, the guide portion including,
  - a rectifying groove extending rearward from a lower position of the groove portion for the jet to flow, and
  - a closing portion disposed close to a front edge portion and having an upper edge portion extending in the left-right direction, the closing portion connected to a front end of the rectifying groove to close the rectifying groove.

In the cavitation processing, the workpiece, the nozzle, and the guide member are immersed in the processing liquid stored in the tank. In the processing liquid, a jet of the processing liquid is ejected from the nozzle toward the guide member. The processing liquid is, for example, water. The processing liquid may be a mixture of water and an abrasive. The abrasive material may be clouded with the processing liquid stored in the tank.

The workpiece is made of metal. The metal constituting the workpiece is, for example, a heat-resistant alloy, an aluminum alloy, a magnesium alloy, titanium, a titanium alloy, or steel. The workpiece is, for example, a mechanical part, a medical device part, or a medical device. Mechanical part is, for example, a gear, a pipe, a valve, a pipe fitting, or an aerospace part. The medical device may be a surgical implant. The aerospace part may be an aircraft engine component or other aircraft component, a rocket engine component, a spacecraft component, a satellite component, or a rocket piping. The workpiece may be manufactured by additive manufacturing.

The groove portion of the workpiece extends, for example, from the left end to the right end of one surface of the workpiece. The groove portions open on the left and right end faces at both ends. The groove may extend linearly. The groove may extend in a bent manner. The cross-sectional shape of the groove portion is, for example, a U-shape or a V-shape. The cross-sectional shape of the groove may be constant in width from the bottom to the opening. The cross-sectional shape of the groove portion may vary in width from the bottom portion to the opening portion. The cross-sectional shape of the groove portion may be constant along the direction in which the groove portion extends. The cross-sectional shape of the groove portion may vary along the direction in which the groove portion extends. The workpiece may have a single groove. The workpiece may have a plurality of grooves.

When the workpiece is a gear, the workpiece may be a spur gear, a helical gear, an inner gear, a double helical gear, or a bevel gear, etc. in which the teeth (tooth grooves) are arranged on a circumference. When the workpiece is a gear, the workpiece may be a rack in which the teeth (tooth grooves) are arranged on a straight line. The rack can be regarded as a gear with an infinite radius.

The rectifying portion of the guide member is, for example, a groove extending in the front-rear direction. The rectifying portion is, for example, a groove extending from the rear end to the front end of one surface of the guide member. The rectifying portion opens to the front and rear end faces at both ends. The rectifying portion may extend linearly. The rectifying portion may extend in a bent manner. When the rectifying portion is a groove, the cross-sectional shape of the rectifying portion is, for example, a U-shape or a V-shape. The cross-sectional shape of the rectifying portion may be constant in width from the bottom portion to the opening portion. The cross-sectional shape of the rectifying portion may vary in width from the bottom portion to the opening portion. The cross-sectional shape of the rectifying portion may be constant along the direction in which the rectifying portion extends. The cross-sectional shape of the rectifying portion may vary along the direction in which the rectifying portion extends. The rectifying portion may be formed of a single groove. The rectifying portion may include a plurality of grooves.

The closing portion of the guide member is, for example, a wall disposed at the front end of the rectifying portion. The closing portion may protrude further toward the workpiece than the rectifying portion. In the closing portion, a portion integral with a portion that closes the front end of the rectifying portion may protrude toward the workpiece. The closing portion may include a member separate from a portion that closes the front end of the rectifying portion, and the separate member may protrude toward the workpiece.

The ejection diameter of the nozzle is, for example, 0.5 mm to 3 mm. The ejection pressure of the jet is, for example, 10 MPa to 200 MPa.

The inclination angle of the jet in the ejection direction may be less than 45 degrees.

The nozzle may be moved in the left-right direction by fixing the position of the workpiece in the left-right direction. The workpiece may be moved in the left-right direction by fixing the position of the nozzle in the left-right direction.

When the workpiece is a gear with circumferentially arranged teeth (tooth grooves), the gear may be rotated about its central axis in order to move the tooth grooves in the front-rear direction.

When the workpiece is a gear (rack) in which the teeth (tooth grooves) are arranged in a straight line, the gear may be moved in parallel in the front-rear direction for moving the tooth grooves in the front-rear direction.

When rotating or moving the gear that is the workpiece, the rotation or movement of the gear and the movement of the nozzle or the gear in the left-right direction may be synchronized. For example, the nozzle or the gear may be moved in the left-right direction every time the gear is rotated by one rotation.

According to the cavitation processing method and the cavitation processing apparatus of the present invention, the cavitation processing can be performed on the bottom portion of the groove of the workpiece.

DETAILED DESCRIPTION

First Embodiment

Figure 1:
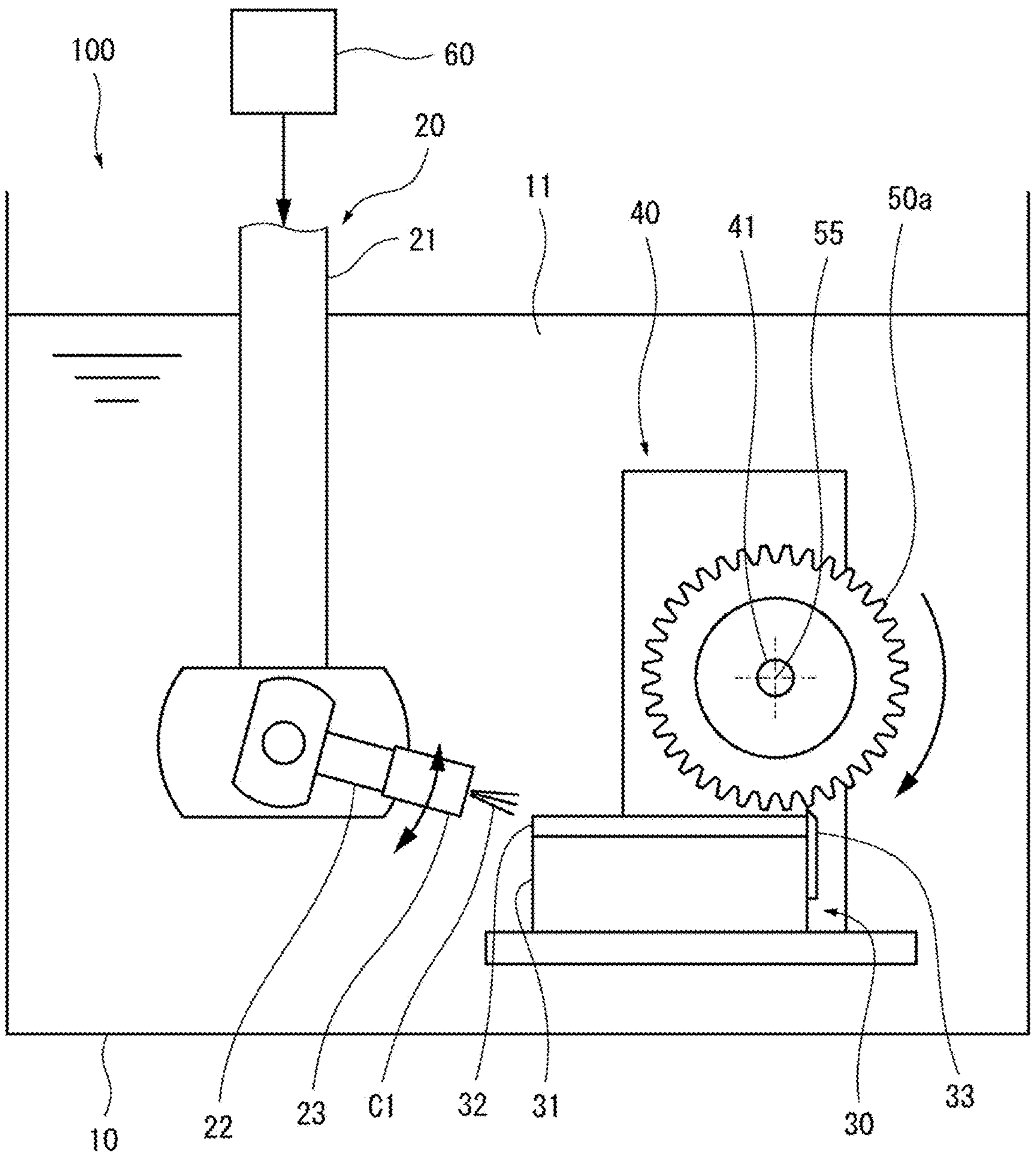
FIG. 1 shows a cavitation processing apparatus according to a first embodiment.

As shown in FIG. 1, a cavitation processing apparatus 100 according to the present embodiment includes a tank 10, an ejection member 20, a guide member 30, a holding member 40, and a high-pressure fluid supply source 60. The cavitation processing apparatus 100 performs a cavitation processing on a spur gear (workpiece) 50*a*.

As will be described later, the ejection member 20 includes a nozzle 23. The front, rear, left, and right sides are determined based on the direction viewed from the nozzle 23. Specifically, a direction away from the nozzle 23 is a front direction, and a direction approaching the nozzle 23 is a rear direction. In the present embodiment, both the front-rear direction and the left-right direction are horizontal directions. That is, in FIG. 1, the right side is the front direction, the left side is the rear direction, the back side of the paper is the left direction, and the front side of the paper is the right direction. The front-rear direction and the left-right direction may not be the horizontal direction.

Figure 2:
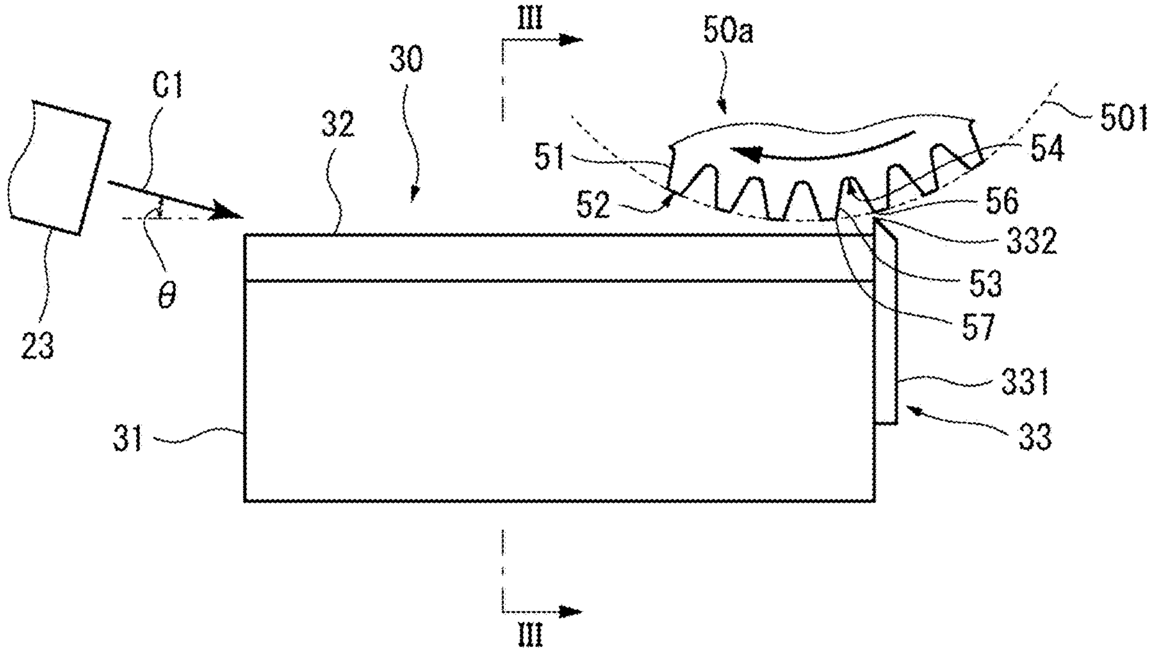
FIG. 2 is an enlarged view of a guide member and a spur gear according to the first embodiment.

The spur gear 50*a* is metallic. As shown in FIG. 2, the spur gear 50*a* has a plurality of teeth 51. The plurality of teeth 51 are arranged on the circumference. Each tooth 51 protrudes toward the outer peripheral side. The tooth 51 has a tapered shape toward the distal end. The distal end of the tooth 51 is a flat tooth distal end surface 52. A tooth groove 53 is formed between adjacent teeth 51. The tooth groove 53 has a shape in which the groove width increases toward the opening. The bottom of the tooth groove 53 is a tooth bottom 54. The tooth bottom 54 is a surface that connects the roots of the teeth 51 adjacent to each other on both sides. The tooth bottom 54 is a curved surface that is concave toward the opening of the tooth groove 53. The tooth groove 53 is a groove portion of the workpiece. The tooth bottom 54 is the bottom of the groove. The tooth bottom 54 is a target portion of the cavitation processing.

Figure 5:
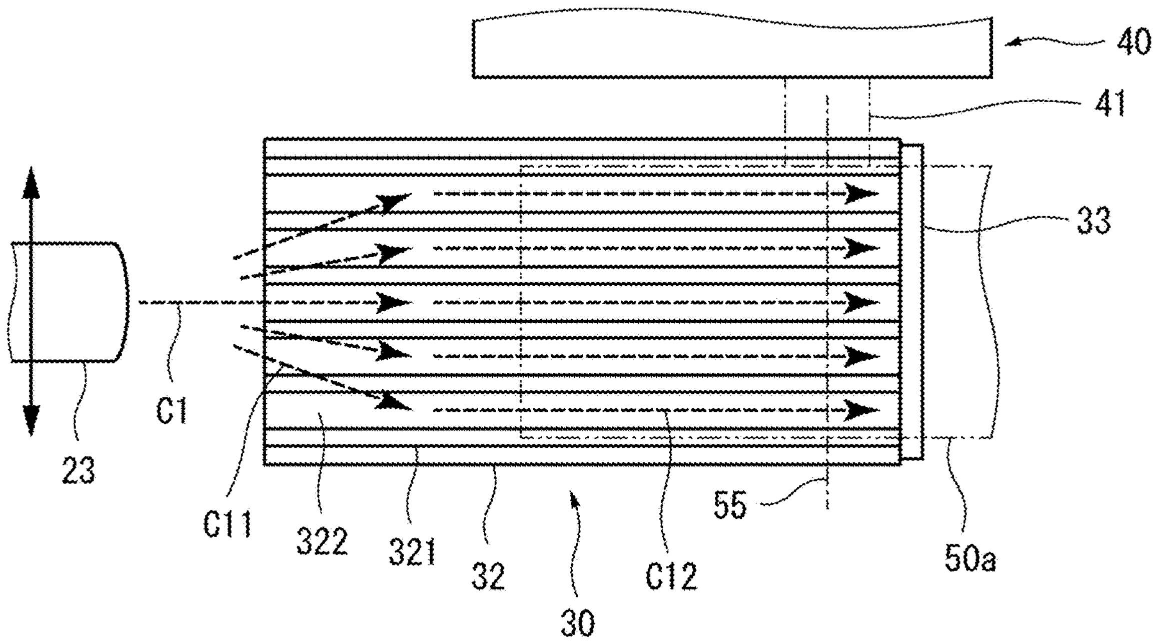
FIG. 5 is a plan view for explaining the flow of the jet according to the first embodiment.

As shown in FIGS. 1 and 5, the spur gear 50*a* is arranged such that a central axis 55 extends in the left-right direction. As shown in FIG. 2, when attention is paid to the lower part of the spur gear 50*a*, a plurality of teeth 51 extending in the left-right direction are arranged in the front-rear direction. The tooth groove 53 extending in the left-right direction is formed between the front and rear teeth 51. The tooth groove 53 opens downward. In a tooth groove 53, the rear side of the tooth distal end surface 52 of the front tooth 51 is a front edge 56 which is a front edge portion of the tooth groove 53. In a tooth groove 53, a front side of the tooth distal end surface 52 of the rear tooth 51 is a rear edge 57 which is a rear edge portion of the tooth groove 53.

As shown in FIG. 1, the tank 10 stores a processing liquid 11. The processing liquid 11 is, for example, water. The tank 10 may include a device for circulating the stored processing liquid 11.

As shown in FIG. 1, the ejection member 20 includes a supply pipe 21, an outlet pipe 22, and the nozzle 23.

The supply pipe 21 is, for example, a straight pipe extending in the up-down direction. The processing liquid 11 supplied from the high-pressure fluid supply source 60 passes through the inside of the supply pipe 21. The high-pressure fluid supply source 60 may be, for example, a pump.

The outlet pipe 22 is connected to a lower end portion of the supply pipe 21. The outlet pipe 22 has a variable angle with respect to the supply pipe 21. The orientation of the distal end of the outlet pipe 22 can be adjusted in a range of at least 0 degrees to 90 degrees (vertically downward) with respect to the front-rear direction.

The nozzle 23 is connected to a distal end of the outlet pipe 22. The nozzle 23 ejects the jet C1 of the processing liquid 11. Changing the direction of the outlet pipe 22 changes the ejection direction of the jet C1. The processing liquid 11 is supplied from the high-pressure fluid supply source 60 to the nozzle 23 through the supply pipe 21 and the outlet pipe 22. The jet C1 contains many cavities. The ejection member 20 is movable in three axial directions in the horizontal direction (the front-rear direction and the left-right direction) and the up-down direction. The ejection velocity (pressure) of the jet C1, the ejection angle, and the 3-axis motion of the ejection member 20 are controlled by a control device (not shown). The ejection diameter (inner diameter) of the nozzle 23 is, for example, 0.5 mm to 3 mm.

As shown in FIG. 1, the guide member 30 includes a base portion 31, a rectifying portion 32, and a closing portion 33.

Figure 3:
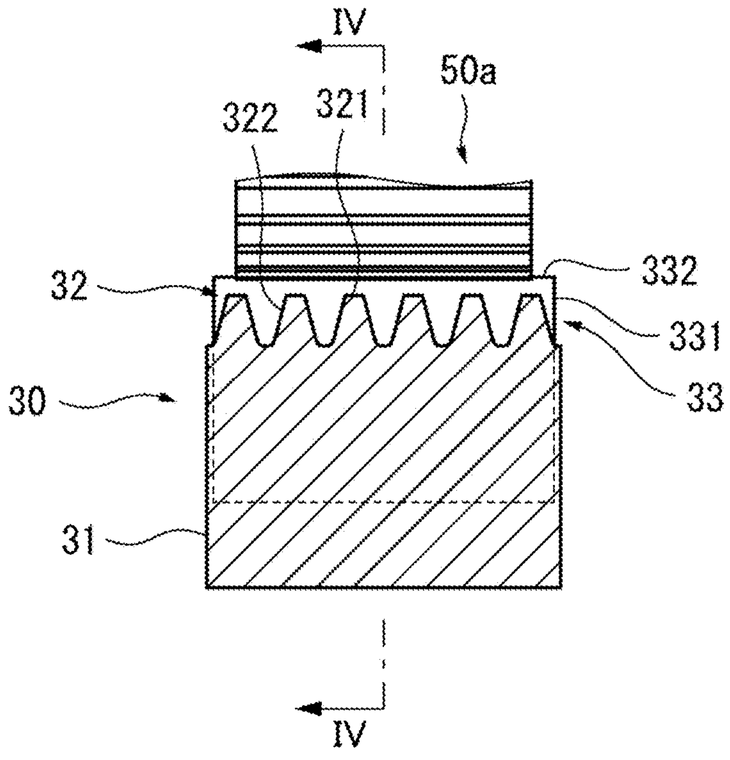
FIG. 3 is a sectional view taken along line III-III in FIG. 2.

The base portion 31 is a rectangular parallelepiped block that is elongate in the front-rear direction. As shown in FIG. 3, the width of the base portion 31 in the left-right direction may be wider than the width of the spur gear 50*a* in the left-right direction.

As shown in FIG. 3, the rectifying portion 32 includes a plurality of (six in the present embodiment) protrusions 321 and a plurality of (five in the present embodiment) rectifying grooves 322. The plurality of protrusions 321 are formed on the upper surface of the base portion 31. The plurality of rectifying grooves 322 are formed between adjacent protrusions 321. Each protrusion 321 extends in the front-rear direction. The plurality of protrusions 321 are arranged in the left-right direction. The protrusion 321 extends from the rear end to the front end of the base portion 31. The protrusion 321 has a tapered shape toward upward. Each rectifying groove 322 extends in the front-rear direction. The plurality of rectifying grooves 322 are arranged on the left and right sides with the protrusions 321 in between. The rectifying groove 322 extends from the rear end to the front end of the base portion 31. Both ends of the rectifying groove 322 are open to the end face. The rectifying groove 322 has a shape in which the groove width increases toward upward. The width and depth of the rectifying groove 322 are approximately the same as the width and depth of the tooth groove 53 of the spur gear 50*a*.

The closing portion 33 has a rectangular plate-shaped wall portion 331. The wall portion 331 is attached to the front end surface of the base portion 31. The wall portion 331 serves as a wall and closes the front end of the rectifying groove 322. The rear surface of the wall portion 331 is a vertical plane. A front side surface of the wall portion 331 may have an upper end portion that is inclined with respect to a vertical plane. That is, the upper end portion of the wall portion 331 has a tapered shape toward upward. The upper edge portion 332, which is an upper edge portion of the wall portion 331, extends in the left-right direction. The upper edge portion 332 protrudes upward from the upper end of the protrusion 321 of the rectifying portion 32. The protruding height of the upper edge portion 332 with respect to the upper end of the protrusion 321 may be shorter than the depth of the rectifying groove 322. The rear surface of the wall portion 331 may be inclined with respect to the vertical plane.

As shown in FIG. 1, the holding member 40 holds the spur gear 50*a*. The holding member 40 has a rotation shaft 41 extending in the left-right direction. The holding member 40 includes a rotation device (not shown) including a motor or the like. The rotation device rotates the rotation shaft 41. The rotation of the rotation shaft 41 is controlled by the control device (not shown). The spur gear 50*a* is attached to the rotation shaft 41. The spur gear 50*a* rotates about a central axis 55 together with the rotation shaft 41.

As shown in FIGS. 1 and 2, the ejection member 20, the guide member 30, the holding member 40, and the spur gear 50*a* are disposed in the tank 10 to be immersed in the processing liquid 11. The guide member 30 is disposed in front of and below the nozzle 23. The nozzle 23 is oriented such that the jet C1 is ejected towards the guide member 30. That is, the ejection direction of the jet C1 is forward and inclined downward. An inclination angle θ of the ejection direction with respect to the front-rear direction is, for example, 15 degrees or more and 45 degrees or less. The holding member 40 is disposed on the left side of the guide member 30. The holding member 40 holds the spur gear 50*a* on the right side thereof. The spur gear 50*a* is disposed above the guide member 30. The center of the guide member 30 in the left-right direction and the center of the spur gear 50*a* in the left-right direction substantially coincide with each other. The height position of the guide member 30 is a position where the upper edge portion 332 of the wall portion 331 is slightly separated from a tooth distal end circle 501 of the spur gear 50*a*. The tooth distal end circle 501 is a trajectory of the distal end of the tooth 51 when the spur gear 50*a* rotates. The gap between the upper edge portion 332 and the tooth distal end circle 501 is, for example, 1 mm or less. It should be noted that the height position of the closing portion 33 with respect to the base portion 31 may be adjustable so as to be able to cope with the case where the diameter of the spur gear and the module, which is the workpiece, are different. Further, the height position of the guide member 30 with respect to the holding member 40 may be adjustable.

The cavitation processing apparatus 100 configured as described above can eject the jet C1 to the spur gear 50*a*. In the present embodiment, the tooth bottom 54 of all the tooth grooves 53 of the spur gear 50*a* are regions to be cavitated. That is, the tooth bottom 54 of all the tooth grooves 53 of the spur gear 50*a* is effectively cavitated.

Figure 4:
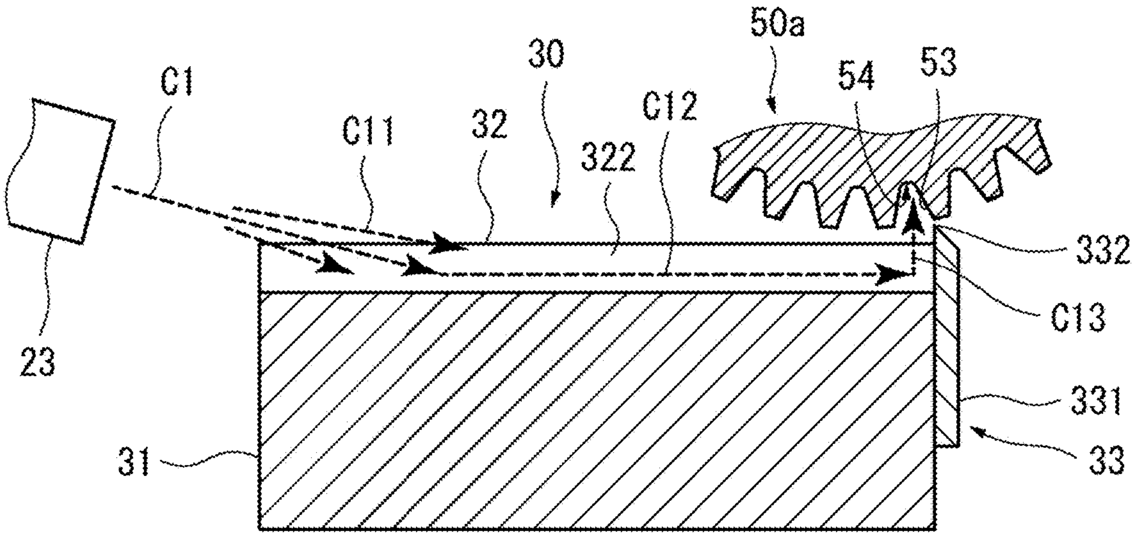
FIG. 4 is a sectional view taken along line IV-IV in FIG. 3 for explaining a flow of a jet according to the first embodiment.

As shown in FIG. 2, the upper edge portion 332 of the wall portion 331 is close to the front edge 56 of one tooth groove 53 of the spur gear 50*a*. That is, the tooth groove 53 and the front end portion of the rectifying groove 322 face each other. As shown in FIG. 5, the center of the nozzle 23 in the left-right direction and the center of the guide member 30 in the left-right direction coincide with each other. When the high-pressure fluid supply source 60 is activated, the jet C1 is ejected from the nozzle 23. As shown in FIGS. 4 and 5, the jet C1 is introduced into the rectifying portion 32 of the guide member 30 from above the rear side while diffusing up, down, left, and right (C11). The jet C1 is dispersed in a plurality of (five) rectifying grooves 322, and flows frontward in the rectifying groove 322 (C12). The front end of the rectifying groove 322 is closed by the wall portion 331. The rectifying groove 322 opens upward. The jet C1 thus impinges on the wall portion 331 at the front end of the rectifying groove 322. The jet C1 changes the direction of the flow toward upward (C13). As the tooth groove 53 and the front end portion of the rectifying groove 322 face each other, the jet C1 penetrates into the tooth groove 53 and collides with the tooth bottom 54 which is the innermost portion of the tooth groove 53. Then, the cavitation processing is performed on the tooth bottom 54.

During the cavitation processing, the spur gear 50*a* is rotated in order to process all of the circumferentially aligned tooth bottoms 54. The tooth bottom 54 of the tooth groove 53 facing the front end portion of the rectifying groove 322 serves as a processing target of the cavitation processing. For example, as shown in FIGS. 1 and 2, when the spur gear 50*a* is rotated in a clockwise direction, the tooth grooves 53 arranged substantially in the front-rear direction move rearward in the lower part of the spur gear 50*a*. The tooth groove 53 opposed to the front end portion of the rectifying groove 322 is sequentially replaced, and the jet C1 sequentially collides with the tooth bottoms 54 arranged in the front-rear direction. As a result, the cavitation processing is sequentially performed on the tooth bottoms 54 arranged in the front-rear directions. The spur gear 50*a* may be continuously rotated. The spur gear 50*a* may be intermittently rotated. For example, the spur gear 50*a* may be rotated angularly corresponding to one tooth 51.

As the cavity grows and collapses in the jet C1, the strength of the cavitation processing changes according to the distance from the nozzle 23. The strength of the cavitation processing is, for example, the strength of the compressive residual stress applied and the density and depth of the dimples formed on the surface. When the cavitation processing is performed, the strongest processing is performed at the point where the distance from the nozzle 23 is the most suitable distance, and the degree of the processing becomes weaker as the distance from the point increases. The suitable distance for the cavitation processing is, for example, a distance of about 40 to 100 times the diameter of the nozzle 23. When the nozzle 23 has a 1 mm diameter, it is desirable that the distance between the nozzle 23 and the tooth bottom 54 is 40 mm to 100 mm. This distance is the distance actually passed by the jet C1. That is, as indicated by the broken-line arrow C11 to C13 in FIG. 4, it is the distance from the nozzle 23 to the tooth bottom 54 through the rectifying groove 322 by colliding with the wall portion 331 to change the direction.

During the cavitation processing, the nozzle 23 (the ejection member 20) may be moved to the left and right. In the cavitation processing, the strongest processing is performed on the central axis of the jet C1, and the degree of the processing becomes weaker as the distance from the central axis to the left and right becomes larger. When the width of the spur gear 50*a* in the left-right direction is wider than the predetermined width, an adequate cavitation processing is not performed on a portion of the tooth bottom 54 that is away from the center axis of the jet C1 in the left-right direction. In this case, by moving the nozzle 23 to the left and right as shown in FIG. 5, the center axis of the jet C1 is also moved, and the cavitation processing is performed on the entire of the tooth bottom 54 in the left-right direction.

The nozzle 23 may be moved continuously. The nozzle 23 may be moved intermittently. For example, the nozzle 23 may be moved so that its position in the left-right direction coincides with each of the rectifying grooves 322. In addition, the spur gear 50*a* (holding member 40) may be moved to the left and right while the nozzle 23 is fixed. That is, the lateral position of the nozzle 23 and the spur gear 50*a* may be relatively changed.

The steps of the cavitation processing method of the present embodiment performed by the cavitation processing apparatus 100 are as follows.

First, the processing liquid 11 is stored in the tank 10. The amount of the processing liquid 11 to be stored is an amount that allows the spur gear 50*a* to be immersed in a sufficient depth. The sufficient depth is, for example, 300 mm to 500 mm. At this time, the ejection member 20, the guide member 30, and the holding member 40 are positioned above the liquid level of the processing liquid 11.

Next, the spur gear 50*a* is fixed to the holding member 40. The spur gear 50*a* is held such that the central axis 55 extends in the left-right direction.

Next, the positions of the ejection member 20, the guide member 30, and the spur gear 50*a* are set. That is, the orientation of the nozzle 23, the distance between the nozzle 23 and the spur gear 50*a*, the distance between the closing portion 33 and the spur gear 50*a*, and the like are set as appropriate.

Next, the ejection member 20, the guide member 30, and the holding member 40 (spur gear 50*a*) are moved downward to be immersed in the processing liquid 11 stored in the tank 10.

Next, the high-pressure fluid supply source 60 is activated to eject the jet C1 from the nozzle 23. The jet C1 reaches the tooth bottom 54 of the tooth groove 53 through the guide member 30, and performs the cavitation processing.

Next, the spur gear 50*a* is rotated. The nozzle 23 is moved to the left and right as necessary.

In this way, the jet C1 is ejected from the nozzle 23, the spur gear 50*a* is rotated, and the nozzle 23 is moved as needed. The cavitation processing is thus performed on the tooth bottom 54. As the jet C1 flows through the rectifying groove 322, the jet C1 is caused to collide with the tooth bottom 54 of the processing target without being distributed to the surroundings.

The order of the steps of the cavitation processing method according to the present embodiment is not limited to the above-described order. For example, the ejection member 20, the guide member 30, and the holding member 40 may be installed in the tank 10 from the beginning. In this case, the processing liquid 11 may be stored in the tank 10 after fixing the spur gear 50*a* to the holding member 40 and setting the positions of the ejection member 20, the guide member 30, and the spur gear 50*a* to each other. The spur gear 50*a* may be rotated from the beginning of the cavitation processing. From the beginning of the cavitation processing, the nozzle 23 may be moved to the left and right. Rotation of the spur gear 50*a* and movement of the nozzle 23 may be performed simultaneously.

The configuration of the spur gear 50*a* is exemplary. The cavitation processing method according to the present embodiment can also be applied to a spur gear in which the shapes of the tooth 51, the tooth groove 53, and the tooth bottom 54 are different from the above example. The cavitation processing method according to the present embodiment can also be applied to gears other than spur gears. Furthermore, the cavitation processing method according to the present embodiment can also be applied to a workpiece having a groove portion other than a gear.

Second Embodiment

Figure 6:
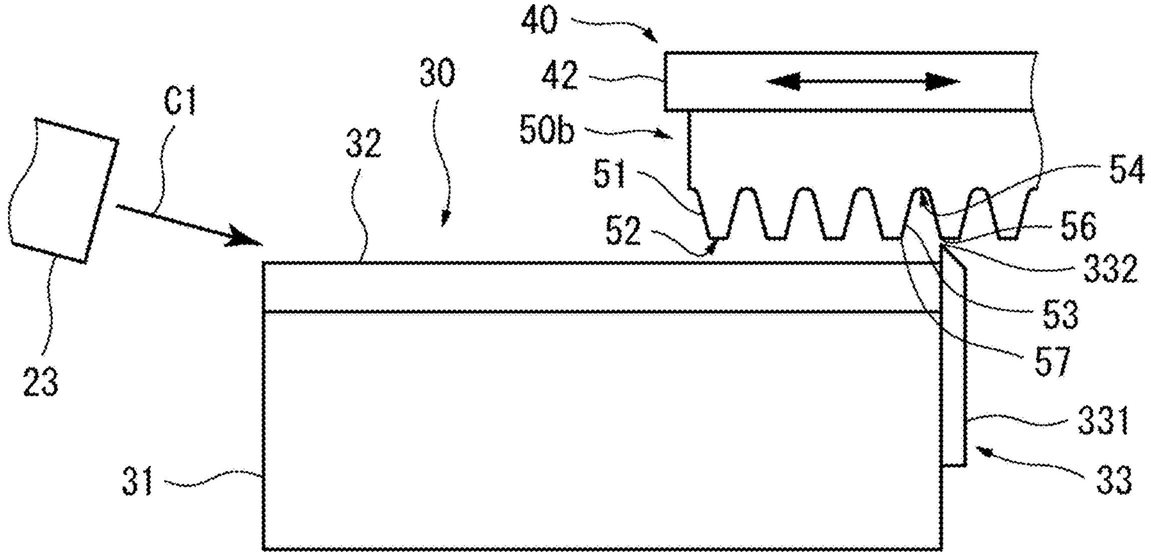
FIG. 6 is an enlarged view of a guide member and a rack according to a second embodiment.

As shown in FIG. 6, in the present embodiment, a workpiece to be cavitated is a rack 50*b*. The cavitation processing apparatus 100 used in the present embodiment differs from the apparatus of the first embodiment in the holding member 40 and the other portions are substantially the same.

The rack 50*b*, which is a workpiece of the present embodiment, can be regarded as a gear having an infinite radius. The rack 50*b* is metallic. The rack 50*b* has a plurality of teeth 51. The plurality of teeth 51 are arranged on a straight line. The tooth 51 has a tapered shape toward the distal end. The distal end of the tooth 51 is a flat tooth distal end surface 52. A tooth groove 53 is formed between adjacent teeth 51. The tooth groove 53 has a shape in which the groove width increases toward the opening. The bottom of the tooth groove 53 is the tooth bottom 54. The tooth bottom 54 is a surface that connects the roots of the teeth 51 adjacent to each other on both sides. The tooth bottom 54 is a curved surface that is concave toward the opening of the tooth groove 53. The tooth groove 53 is a groove portion of the workpiece. The tooth bottom 54 is the bottom of the groove. The tooth bottom 54 is a target portion of the cavitation processing.

The rack 50*b* is arranged such that the plurality of teeth 51 are arranged in front-rear direction and protrude downward. Between the front and rear teeth 51, the tooth groove 53 extending in the left-right direction is formed. The tooth groove 53 opens downward. In a tooth groove 53, the rear side of the tooth distal end surface 52 of the front tooth 51 is a front edge 56 which is a front edge portion of the tooth groove 53. In a tooth groove 53, the front side of the tooth distal end surface 52 of the rear tooth 51 is a rear edge 57 which is a rear edge portion of the tooth groove 53.

The holding member 40 of the cavitation processing apparatus 100 according to the present embodiment includes a holding table 42. The holding table 42 fixes the rack 50*b* with fasteners such as bolts and clamps, or fixes the rack 50*b* by clamping. The holding table 42 is movable in the front-rear direction while holding the rack 50*b*.

The holding table 42 and the rack 50*b* may be inclined so as to lower the front. At this time, the holding table 42 may move in the inclination direction of the holding table 42. The holding table 42 may move in the front-rear direction.

In the present embodiment, the cavitation processing is performed on all the tooth bottoms 54 of the rack 50*b*.

The step of the cavitation processing method according to the present embodiment is different from the step of the cavitation processing method of the first embodiment in that the rack 50*b* (holding table 42) is moved in the front-rear direction, and the other steps are substantially the same.

The rack 50*b* (holding table 42) is moved in the front-rear direction in order to perform the cavitation processing to all the tooth bottoms 54 arranged on a straight line. For example, as shown in FIG. 6, when the rack 50*b* is moved backward, the tooth grooves 53 arranged in the front-rear direction are moved backward. The tooth groove 53 opposed to the front end portion of the rectifying groove 322 is thus sequentially replaced, and the jet C1 sequentially collides with the tooth bottoms 54 arranged in the front-rear direction. The cavitation processing is thus sequentially performed on the tooth bottoms 54 arranged in the front-rear directions.

The rack 50*b* may be moved continuously. The rack 50*b* may be moved intermittently. For example, the rack 50*b* may be moved by a distance corresponding to one tooth 51.

In this way, the jet C1 is ejected from the nozzle 23, the rack 50*b* is moved, and the nozzle 23 is moved as needed. The cavitation processing is thus performed on the tooth bottom 54 of the rack 50*b*.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

11 Processing liquid
23 Nozzle
30 Guide member
32 Rectifying portion
33 Closing portion
50*a* Spur gear (Workpiece)
50*b* Rack (Workpiece)
53 Tooth groove (Groove portion)
54 Tooth bottom (Bottom portion)
56 Front edge (Edge portion)
57 Rear edge (Edge portion)
C1 Jet

What is claimed is:

1. A cavitation processing method, comprising:

immersing a nozzle that ejects a jet of a processing liquid of cavitation, a workpiece including a groove portion extending in a left-right direction and having edge portions at a front and a rear as viewed from the nozzle, and a guide member including a rectifying portion that flows the jet in a front-rear direction and a closing portion that closes a front end of the rectifying portion in the processing liquid;

moving the closing portion to close to a front edge portion;

ejecting the jet from the nozzle; and introducing the jet to the rectifying portion from the rear to cause the jet to collide with the closing portion for changing a flow direction of the jet to cause the jet to collide with a bottom portion of the groove portion, wherein the rectifying portion includes a plurality of protrusions and a plurality of rectifying grooves formed between adjacent protrusions, the closing portion includes an upper edge portion extending in the left-right direction, wherein the closing portion is connected to the front end of the plurality of rectifying grooves to close the rectifying grooves, and a protruding height of the upper edge portion with respect to an upper end of the protrusions is shorter than a depth of the rectifying grooves.

2. The cavitation processing method according to claim 1, further comprising:

relatively changing a position in the left-right direction between the nozzle and the workpiece.

3. The cavitation processing method according to claim 1, wherein an ejection direction of the jet is inclined downward with respect to the front-rear direction.

4. The cavitation processing method according to claim 3, wherein an inclination angle of the ejection direction with respect to the front-rear direction is in a range between 15 degrees and 45 degrees.

5. The cavitation processing method according to claim 1, wherein the workpiece is a gear, the groove portion is a tooth groove of the gear, and the bottom portion is a tooth bottom of the gear.

6. The cavitation processing method according to claim 5, further comprising:

rotating or moving the gear for the tooth groove to move in the front-rear direction; and causing the jet to collide with each of the tooth bottom of the tooth groove arranged in the front-rear direction.

7. The cavitation processing method according to claim 2, wherein an ejection direction of the jet is inclined downward with respect to the front-rear direction.

8. The cavitation processing method according to claim 2, wherein the workpiece is a gear, the groove portion is a tooth groove of the gear, and the bottom portion is a tooth bottom of the gear.

9. The cavitation processing method according to claim 3, wherein the workpiece is a gear, the groove portion is a tooth groove of the gear, and the bottom portion is a tooth bottom of the gear.

10. The cavitation processing method according to claim 4, wherein the workpiece is a gear, the groove portion is a tooth groove of the gear, and the bottom portion is a tooth bottom of the gear.

11. A cavitation processing apparatus, comprising:

a tank configured to store a processing liquid;

a nozzle configured to be immersed in the tank to eject a jet of the processing liquid;

a holding member disposed in the tank, the holding member configured to hold a workpiece having a groove portion extending in a left-right direction and having edge portions at a front and a rear as viewed from the nozzle; and a guide portion disposed below the workpiece, the guide portion including, a rectifying groove formed between adjacent protrusions of the guide portion and extending rearward from a lower position of the groove portion for the jet to flow, and a closing portion disposed close to a front edge portion and having an upper edge portion extending in the left-right direction, the closing portion connected to a front end of the rectifying groove to close the rectifying groove, wherein a protruding height of the upper edge portion with respect to an upper end of the protrusions is shorter than a depth of the rectifying groove.

12. The cavitation processing apparatus according to claim 11, wherein the workpiece is a gear, and the holding member includes a rotation shaft configured to hold the gear and rotate the gear about a center axis.

* * * * *